US012715006B2

(12) United States Patent
Souza et al.

(10) Patent No.: US 12,715,006 B2
(45) Date of Patent: Aug. 25, 2026

(54) METHOD AND SYSTEM FOR REMOVING IRON ORE PARTICLES ADHERING BY MAGNETIC HYSTERESIS TO A MAGNETIC MATRIX OF A VERTICAL MAGNETIC SEPARATOR

(71) Applicants: Vale S.A., Rio de Janeiro (BR); ASSOCIAÇÃO INSTITUTO TECNOLÓGICO VALE-ITV, Rio de Janeiro (BR)

(72) Inventors: Leonardo Cavalho Oliveira de Souza, Ouro Preto (BR); Neymayer Pereira Lima, Ouro Preto (BR); Thiago Antonio Melo Euzebio, Ouro Preto (BR); Thomás Vargas Barsante Pinto, Ouro Preto (BR); Klaydison Carlaile Silva, Belo Horizonte (BR)

(73) Assignees: Vale S.A., Rio de Janeiro (BR); ASSOCIAÇÃO INSTITUTO TECNOLÓGICO VALE-ITV, Rio de Janeiro (BR)

( * ) Notice: Subject to any disclaimer, the term of this patent is extended or adjusted under 35 U.S.C. 154(b) by 603 days.

(21) Appl. No.: 18/037,049

(22) PCT Filed: Nov. 8, 2021

(86) PCT No.: PCT/BR2021/050485
§ 371 (c)(1),
(2) Date: May 15, 2023

(87) PCT Pub. No.: WO2022/099394
PCT Pub. Date: May 19, 2022

(65) Prior Publication Data
US 2024/0024894 A1 Jan. 25, 2024

(30) Foreign Application Priority Data
Nov. 16, 2020 (BR) ........................ 102020023390-4

(51) Int. Cl.
*B03C 1/032* (2006.01)
*B03C 1/034* (2006.01)
*B03C 1/04* (2006.01)

(52) U.S. Cl.
CPC .............. *B03C 1/032* (2013.01); *B03C 1/034* (2013.01); *B03C 1/04* (2013.01); *B03C 2201/20* (2013.01)

(58) Field of Classification Search
CPC .......... B03C 1/032; B03C 1/034; B03C 1/04; B03C 2201/20
(Continued)

(56) References Cited

U.S. PATENT DOCUMENTS 9,610 A * 3/1853 Gardiner .................. B03C 1/14 209/225
2,268,128 A * 12/1941 Reeves ..................... B03C 1/18 209/229
(Continued)

FOREIGN PATENT DOCUMENTS

AU 2017202002 A1 4/2017
BR 102012008340 A2 10/2013
(Continued)

OTHER PUBLICATIONS

English Translation of CN 201815376; Inv: Chen et al.; Pub. Date: May 2011 (Year: 2011).*
(Continued)

*Primary Examiner* — Joseph C Rodriguez
(74) *Attorney, Agent, or Firm* — ArentFox Schiff LLP

(57) ABSTRACT

A system for removing iron ore particles adhered by magnetic hysteresis to a magnetic matrix of a vertical magnetic separator, the vertical magnetic separator having a separation ring with a magnetic matrix; an ore feed inlet an ore accumulation vessel positioned in the lower portion of the
(Continued)

magnetic matrix and having an outlet for low magnetic-susceptibility material; a magnetic field-generating device adapted to generate a magnetic field in the region of the accumulation vessel; at least one collection tray positioned internally to the magnetic matrix and adapted to collect material with greater magnetic susceptibility detached from the magnetic matrix; and a collecting container adapted to receive the material with greater magnetic susceptibility from at least one collecting tray. The system further includes a demagnetizer; a mechanical device for cleaning the magnetic matrix positioned at a position subsequent to the demagnetizer; and at least one device generating jets of compressed air.

8 Claims, 3 Drawing Sheets

(58) Field of Classification Search
USPC .......................................... 209/219, 228–230
See application file for complete search history.

(56) References Cited

U.S. PATENT DOCUMENTS

| | | | | | |
|---|---|---|---|---|---|
| 3,754,713 | A | | 8/1973 | Kienast et al. | |
| 4,046,680 | A | * | 9/1977 | Fritz | B03C 1/03 209/225 |
| 4,191,591 | A | * | 3/1980 | Bender | B03C 1/03 134/102.1 |
| 4,318,804 | A | * | 3/1982 | Nakajima | B03C 1/12 209/230 |
| 4,354,930 | A | * | 10/1982 | Nakajima | B03C 1/12 209/230 |
| 4,451,360 | A | * | 5/1984 | Salmi | B03C 1/02 209/225 |
| 4,737,294 | A | * | 4/1988 | Kukuck | B03C 1/03 209/225 |
| 4,874,508 | A | * | 10/1989 | Fritz | B03C 1/03 209/214 |
| 5,462,173 | A | * | 10/1995 | Darling | B03C 1/03 209/636 |
| 7,743,926 | B2 | * | 6/2010 | Lewis-Gray | B03C 1/247 209/225 |
| 9,833,791 | B2 | * | 12/2017 | Wang | B03C 1/14 |

FOREIGN PATENT DOCUMENTS

| | | | |
|---|---|---|---|
| BR | 102015003408 | A2 | 6/2015 |
| BR | 102015031762 | A2 | 7/2016 |
| BR | 102016022548 | A2 | 5/2018 |
| BR | 112015009205 | B1 | 9/2019 |
| BR | 112019018701 | A2 | 4/2020 |
| CN | 2306837 | Y | 2/1999 |
| CN | 1994578 | A | 7/2007 |
| CN | 101402067 | A | 4/2009 |
| CN | 201295638 | Y | 8/2009 |
| CN | 201659025 | U | 12/2010 |
| CN | 203291956 | U | 11/2013 |
| CN | 103785528 | A | 5/2014 |
| CN | 104069943 | A | 10/2014 |
| CN | 204892118 | U | 12/2015 |
| CN | 105797845 | A | 7/2016 |
| CN | 106824519 | A | 6/2017 |
| CN | 108885930 | A | 11/2018 |
| CN | 109847926 | A | 6/2019 |
| CN | 111373065 | A | 7/2020 |
| DE | 3038426 | A1 | 4/1981 |
| DE | 2949855 | A1 | 6/1981 |
| EP | 2604347 | A1 | 6/2013 |
| GB | 191312368 | A | 12/1913 |
| WO | 2015173506 | A1 | 11/2015 |

OTHER PUBLICATIONS

International Search Report and Written Opinion issued in International Patent Application No. PCT/BR2021/050485 on Jan. 16, 2022.

* cited by examiner

METHOD AND SYSTEM FOR REMOVING IRON ORE PARTICLES ADHERING BY MAGNETIC HYSTERESIS TO A MAGNETIC MATRIX OF A VERTICAL MAGNETIC SEPARATOR

CROSS REFERENCE TO RELATED APPLICATIONS

The present application is a U.S. national stage of PCT International Patent Application No. PCT/BR2021/050485, filed on Nov. 8, 2021, which claims priority to BR 102020023390-4, filed on Nov. 16, 2020. The contents of the above applications are incorporated herein by reference in their entirety.

FIELD OF THE INVENTION

This invention is related to the magnetic separation processes of iron ore. More specifically, this invention is related to an iron ore magnetic separation process that uses a vertically pulsating high-gradient magnetic separator (VPHGMS) in order to reduce water consumption for this purpose.

FUNDAMENTALS OF THE INVENTION

As known in the current state of the art, the process of magnetic separation of iron ore occurs in equipment called magnetic separators. It is based on the difference in the behavior of mineral particles when subjected to a magnetic field.

The material to be separated comprises a mixture of particles that can be divided into five categories concerning their susceptibility to magnetization: diamagnetic; paramagnetic; ferrimagnetic; antiferromagnetic; and ferromagnetic.

The diamagnetic particles are weakly magnetized and align in the opposite direction to the magnetic field in which they are inserted. In practice, the magnetism of these particles can be considered zero.

The paramagnetic particles, as well as the ferrimagnetic and antiferromagnetic ones, are slightly magnetized, and they align in the same direction as the magnetic field, for which magnetic separators can be used.

The ferromagnetic particles, on the other hand, are strongly magnetized and align in the same direction as the magnetic field. For example, in an iron ore slurry, hematite (constituent iron mineral) is antiferromagnetic, thus being susceptible to the magnetic field, and quartz (main gangue mineral, source of $SiO_2$) is diamagnetic, thus being little susceptible to the field.

The conventional magnetic separator consists of a rotational ring, or carousel, which can be positioned vertically or horizontally. Specifically for a vertical separator, the ring contains matrices and steel parts positioned along its length, in which the mineral particles are trapped after being magnetized by a magnetic field created by induced magnets, thus magnetizing the particles of interest (ore) in the influence region of the magnetic field.

However, even after the matrices leave the influence region of the magnetic field, the ore remains attached to the matrices due to the magnetic hysteresis force. This creates a resistance to material release from the matrices, reducing mineral separation efficiency. It is well known to those skilled in the art that magnetic hysteresis occurs when a material is subjected to a magnetic field and becomes magnetized. Still, when removing this field, the material is not demagnetized completely or instantly.

In the state of the art, the magnetic material attached to the matrices due to magnetic hysteresis is detached by injecting water jets. As this process (use of water jets) is carried out throughout the separation process, water consumption is remarkably high and contributes significantly to the need for subsequent dewatering of the products obtained (magnetic concentrate and non-magnetic waste), resulting in high production costs and great environmental impact.

A series of state-of-the-art documents refer to magnetic separators of different configurations. According to Zeng and Dahe (2003), in their work entitled " ", the first vertically pulsating high-gradient magnetic separators (VPHGMS) were developed in 1988.

This equipment has a combined mechanism of magnetic field, pulsating fluid and gravity so that it continuously benefits thin, weakly magnetic materials. One of their benefits is a high mineral recovery rate.

Since then, efforts have been made to improve this equipment. Chinese document CN2306837Y shows improvements to a vertical magnetic separator, including a demagnetizer. The demagnetizer aims to avoid the agglomeration of particles in the matrices and reduce clogging. However, this demagnetizer is located after the ore washing step; that is, water is still required (particularly water jets) to separate the magnetic material attached to the matrices due to magnetic hysteresis.

It is also possible to identify some improvements to VPHGMS proposed in patent documents filed in Brazil, such as documents BR102016022548-5 and BR102015031762-0. Such documents propose different geometries for the magnetic matrices, leading to increased performance, increased quantity and variety of recovered magnetic particles, including particles of smaller granulometry and magnetic susceptibility. Although these proposed magnetic matrices provide some reduction in water consumption during the separation process, it is still not entirely avoided by such technology.

Document CN103785528B presents a rotary magnetic separator by a permanently magnetic drum, developed to improve the concentrated ore content and reduce waste. For this type of equipment, water is used to rinse the magnetic drum.

Similar equipment is proposed in document CN109847926, which proposes a dry magnetic separation method. Such technology aims to promote improvements to avoid contamination and increase the purity of the product. The equipment described works with air blowers perpendicular to the roller rotation axis. The operation of this equipment presents a series of differences in relation to a vertical high gradient magnetic separator, such as the presence of permanent magnets, field strength, lack of matrices and a different separation method.

Finally, document CN104069943A proposes a dry mineral separation technique. However, the method does not apply to a VPHGMS and does not use compressed air injection. Mineral separation occurs on conveyor belts that load and unload the material based on its magnetic properties.

It is clear from the documents presented that the current state of the art lacks a VPHGMS-type magnetic separator that does not use water to separate magnetic material attached to the matrices due to magnetic hysteresis. Thus, none of the said works developed a method for replacing the water washing system with a process that completely excludes the use of water in a VPHGMS to release magnetized particles still retained in the carousel due to magnetic hysteresis.

As detailed below, this invention aims to solve these problems in the state of the art described above practically and efficiently.

SUMMARY OF THE INVENTION

This invention aims to provide a system to be coupled to a vertically pulsating high-gradient magnetic separator (VPHGMS) to remove the magnetized particles adhered to the matrices due to magnetic hysteresis, providing better separation efficiency, reduction of water consumption in the plant as a whole and reduction of process costs for dewatering products in subsequent processes without affecting the capacity of existing equipment.

Aiming to achieve the objectives mentioned above, this invention provides a method and a system for removing iron ore particles adhered by magnetic hysteresis to a magnetic matrix of a vertical magnetic separator, with the vertical magnetic separator comprising: a separation ring comprising a magnetic matrix; an ore feed inlet; an ore accumulation vessel positioned in the lower portion of the magnetic matrix, comprising an outlet for material with low magnetic susceptibility; a magnetic field-generating device adapted to generate a magnetic field in the region of the accumulation vessel; at least one collection tray positioned internally to the magnetic matrix and adapted to collect material with greater magnetic susceptibility detached from the magnetic matrix; and a collecting container adapted to receive the material with greater magnetic susceptibility from at least one collecting tray, the system comprises:
- a demagnetizer positioned above the first collecting tray of at least one collecting tray;
- a mechanical device for cleaning the magnetic matrix positioned after the demagnetizer; and
- at least one device generating jets of compressed air positioned after the mechanical device used for cleaning the magnetic matrix.

BRIEF DESCRIPTION OF THE FIGURES

The description below refers to the attached figures and their respective reference numbers.

DETAILED DESCRIPTION OF THE INVENTION

Preliminarily, it is emphasized that the following description will start from a preferred embodiment of the invention. However, as will be apparent to those skilled in the art, the invention is not limited to that particular embodiment.

The system and method for removing iron ore particles adhered by magnetic hysteresis to a matrix of a vertical magnetic separator proposed in this document can modify the operation of a vertical magnetic separator (optionally a VPHGMS) so that it proceeds to carry out the removal of magnetized particles attached to the magnetic matrix without using water. Thus, the invention significantly reduces water consumption in this process and, consequently, the financial and environmental costs inherent to its use.

In this report, the vertical magnetic separator adopted for descriptive purposes is optionally a VPHGMS. Therefore, this type of vertical magnetic separator will be used for most of the following descriptions. However, it should be understood that whenever the term VPHGMS is used, all features of the invention may be applied to a vertical magnetic separator with different configurations. In other words, the application of the invention should not be limited to a VPHGMS separator but to any vertical magnetic separator.

Currently, VPHGMS magnetic separation equipment operates wet. It is well known that the ore slurry is poured into a container immersed in a magnetic field, magnetizing the most susceptible particles. The vertical carousel (separation ring), characteristic of this equipment, has a rotational movement that passes through the magnetic container when it is at its lowest point and traps (by magnetic forces) the particles in matrices constructed by steel filaments and positioned on the contour of the carousel. There is also a pulsation mechanism in the container that promotes the constant movement of the particles in the slurry to maximize their imprisonment in the matrices, mainly the finer ones. The less susceptible particles are not magnetized, as they separate from the others and become waste. As the carousel rotates and the matrices move out of the magnetic field's region of influence, the particles of interest (magnetized particles) remain attached to the steel filaments due to magnetic hysteresis. Near the top, a stream of water is applied to the magnetic matrices to separate these still-trapped particles.

Figure 1:
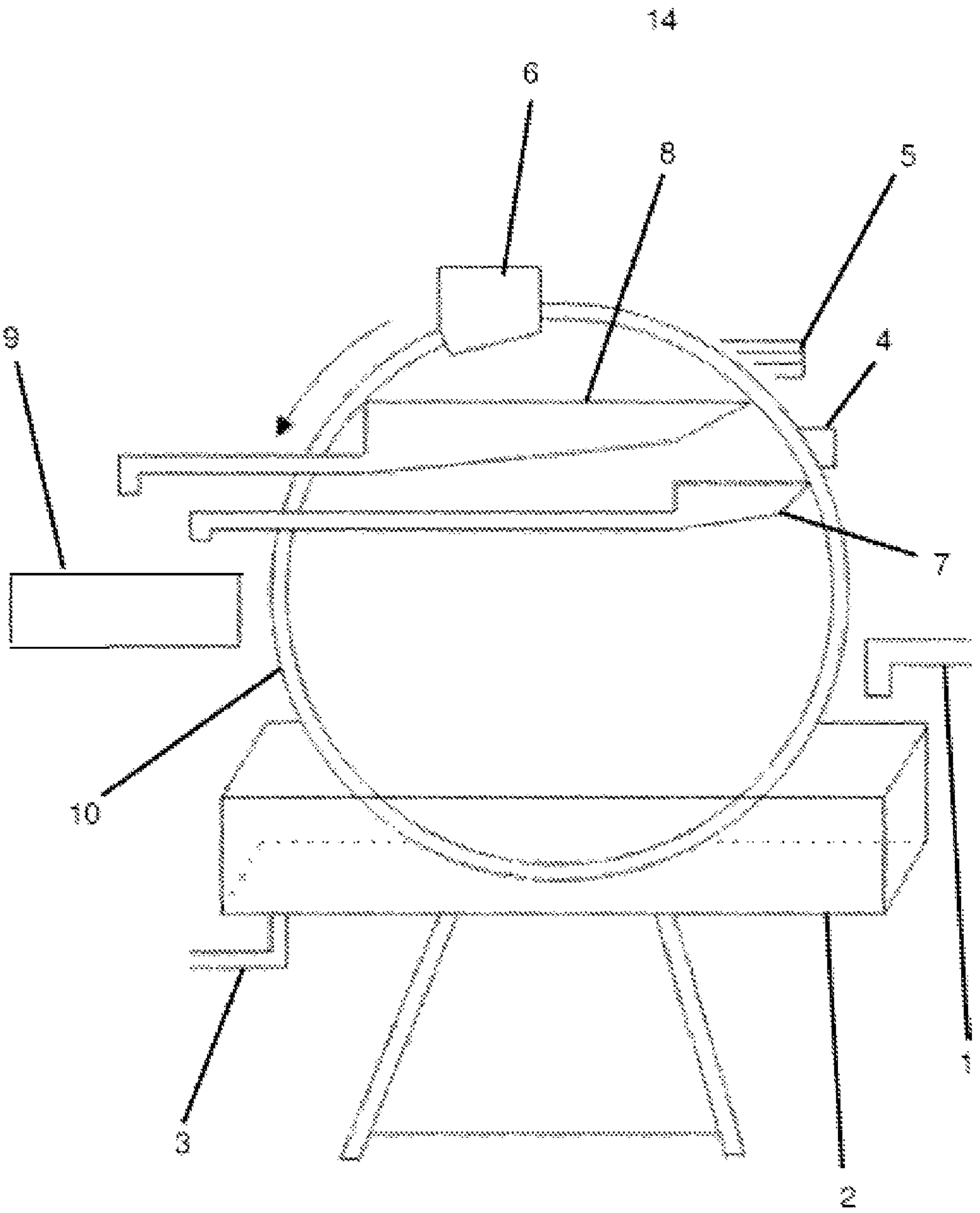
FIG. 1 illustrates a schematic view of an optional embodiment of the system for removing iron ore particles adhered by magnetic hysteresis to a matrix of a vertical magnetic separator, according to this invention.

FIG. 1 illustrates a schematic view of an optional embodiment of the system for removing iron ore particles adhered by magnetic hysteresis to a matrix of a vertical magnetic separator, according to this invention.

In a broader sense, this invention provides a system for removing iron ore particles adhered by magnetic hysteresis to a magnetic matrix of a vertical magnetic separator, with the vertical magnetic separator comprising: a separation ring (10) comprising a magnetic matrix; an ore feed inlet (1); an ore accumulation vessel (2) positioned in the lower portion of the separation ring (10); a magnetic field-generating device adapted to generate a magnetic field in the region of the accumulation vessel (2); at least one collection tray (7, 8) positioned internally to the magnetic matrix and adapted to collect material with greater magnetic susceptibility detached from the magnetic matrix; and a collecting container (9) adapted to receive the material with greater magnetic susceptibility from at least one collecting tray (7, 8).

Notably, the system comprises: a demagnetizer (4) positioned at a higher position than the first collecting tray (7) of at least one collecting tray (7, 8); a mechanical cleaning device (5) of the magnetic matrix positioned after the demagnetizer (4); and at least one compressed air jet-generating device (6) positioned after the mechanical cleaning device (5) of the magnetic matrix.

It is worth noting that the positioning sequence of the system elements, as indicated above, obviously depends on the rotation direction of the separation ring (10). In the illustrated example, the separation ring (10) rotates counterclockwise. Thus, a particle adhered to this ring's magnetic matrix will first pass through the region impacted by the demagnetizer (4), then through the mechanical cleaning device (5), and finally through the compressed air jet-generating device (6).

It is important to note that this sequence of elements can be changed in particular configurations. In different configurations, more than one of these elements can be adopted and even used interchangeably.

Optionally, as shown in FIG. 1, the magnetic separator applied in the invention's system is of the VPHGMS type. However, it should be understood that the system can be applied to any known type of vertical magnetic separator, as should be evident to anyone skilled in the art.

Next, the operation of the invention will be explained. The ore, composed of particles with greater magnetic susceptibility and particles with low or zero magnetic susceptibility, is poured through the ore feed inlet 1 into an ore accumulation vessel (2). In that region, a magnetic field-generating device, adapted to generate a magnetic field in the region of the accumulation vessel (2), is positioned.

The ore particles with greater susceptibility will be magnetized and attached to the magnetic matrices of the separation ring (10). On the other hand, particles with low susceptibility will not be magnetized and will follow the flow to another process through an outlet (3) of material with low magnetic susceptibility.

As previously stated, the separation ring (10) moves counterclockwise and carries the magnetized particles adhered by magnetic beams to the magnetic matrices along its trajectory. However, even outside the region of influence of the magnetic field, some particles remain attached to the magnetic matrices by magnetic hysteresis alone.

Figure 2A:
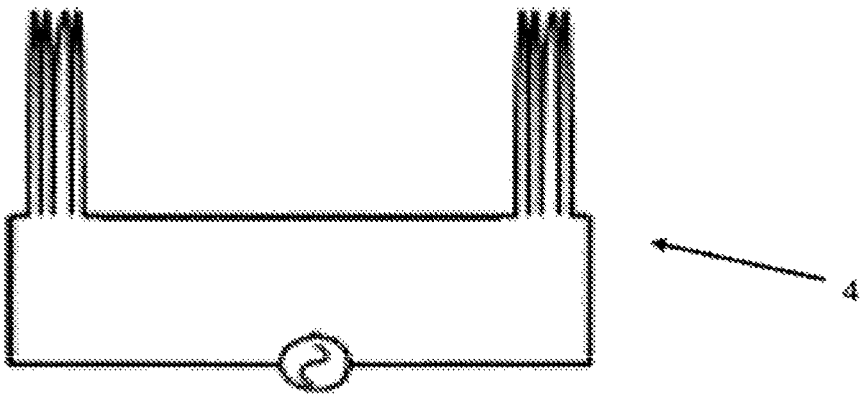
FIG. 2*a* illustrates a schematic view of a demagnetizer optionally adopted by the present invention.

To facilitate the detachment of these particles, a demagnetizer (4) is provided in a higher position than a first collecting tray (7) of at least one collecting tray (7, 8). FIG. 2*a* illustrates a schematic view of a demagnetizer (4) optionally adopted by the present invention. The proposed demagnetizer (4) creates an alternating magnetic field by passing alternating current through the coils. This alternating magnetic field demagnetizes the particles attached to the magnetic matrices, causing some of them to detach from the matrices and be collected by a first collecting tray (7) of at least one collecting tray (7, 8), which directs them to the collecting container (9).

In the preferred embodiment, as illustrated in FIG. 1, two collecting trays can optionally be adopted, in which: a first collecting tray (7) is positioned below the demagnetizer (4); and a second collecting tray (8) is positioned below the mechanical cleaning device (5) of the magnetic matrix's mechanical cleaning device (5).

The mechanical cleaning device (5) cleans the magnetic matrices by introducing flexible filaments inside them. Thus, the mechanical device remains fixed next to the fixed structure of the magnetic separator, and the filaments sweep all the magnetic matrices of the separation ring (10) due to the uninterrupted rotational movement of the separation ring (10) so that the ore is directed to the second collecting tray (8). Such ore, even after being subjected to demagnetization, is still agglomerated in the magnetic matrices.

Figure 2B:
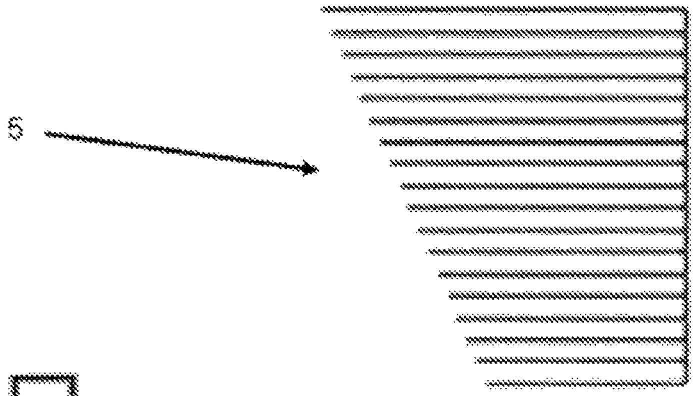
FIG. 2*b* illustrates a schematic view of a mechanical device for cleaning the magnetic matrix, optionally adopted by the present invention.

FIG. 2*b* illustrates a schematic view of a mechanical device for cleaning (5) the magnetic matrix, optionally adopted by the present invention. The filaments of the mechanical cleaning device (5) penetrate the magnetic matrices and separate part of the ore before the compressed air jet-generating device (6). As the separation ring (10) has uninterrupted rotational movement, the flexible filaments penetrate all the matrices that pass through the point where the mechanical device is installed. Preferably, the filaments are short in the lower part of the mechanical cleaning device (5) and elongate as they approach the top. Thus, cleaning efficiency is improved since the filaments follow the arc formed by the separation ring (10). Each flexible filament is made of material with zero magnetic properties, so there is no attraction of ore particles due to magnetic hysteresis.

Figure 2C:
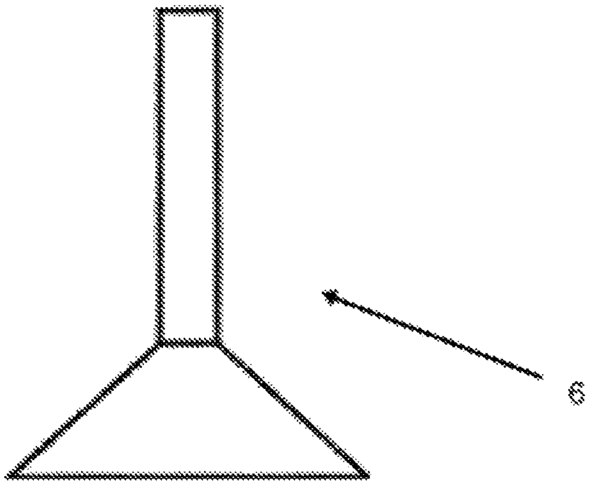
FIG. 2*c* illustrates a schematic view of a compressed air jet-generating device optionally adopted by the present invention.

Next, and above the second collecting tray (8), at least one compressed air jet-generating device (6) is provided. FIG. 2*c* illustrates a schematic view of a compressed air jet-generating device (6) optionally adopted by the present invention. At this point, compressed air jets are applied to the carousel to separate the particles still attached to the matrices. Preferably, at least one compressed air generating device is positioned in front of the separation ring at an angle that enables the compressed air to hit the magnetic matrix in the opposite direction to its rotation or parallel to the separation ring, in which the compressed air hits the magnetic matrix from the side. Thus, the particles detached here are collected by at least one collection tray (7, 8) (preferably the second collection tray (8)) and also sent to the concentrate collection container (9).

At least one compressed air jet-generating device (6) is composed of a set of tubes that constantly apply compressed air to the magnetic matrices of the separation ring (10) in order to separate the ore particles (detach them from the magnetic matrices). These particles are more easily separated as they have been demagnetized. Thus, the compressed air can separate the iron ore from the matrix.

Figure 3:
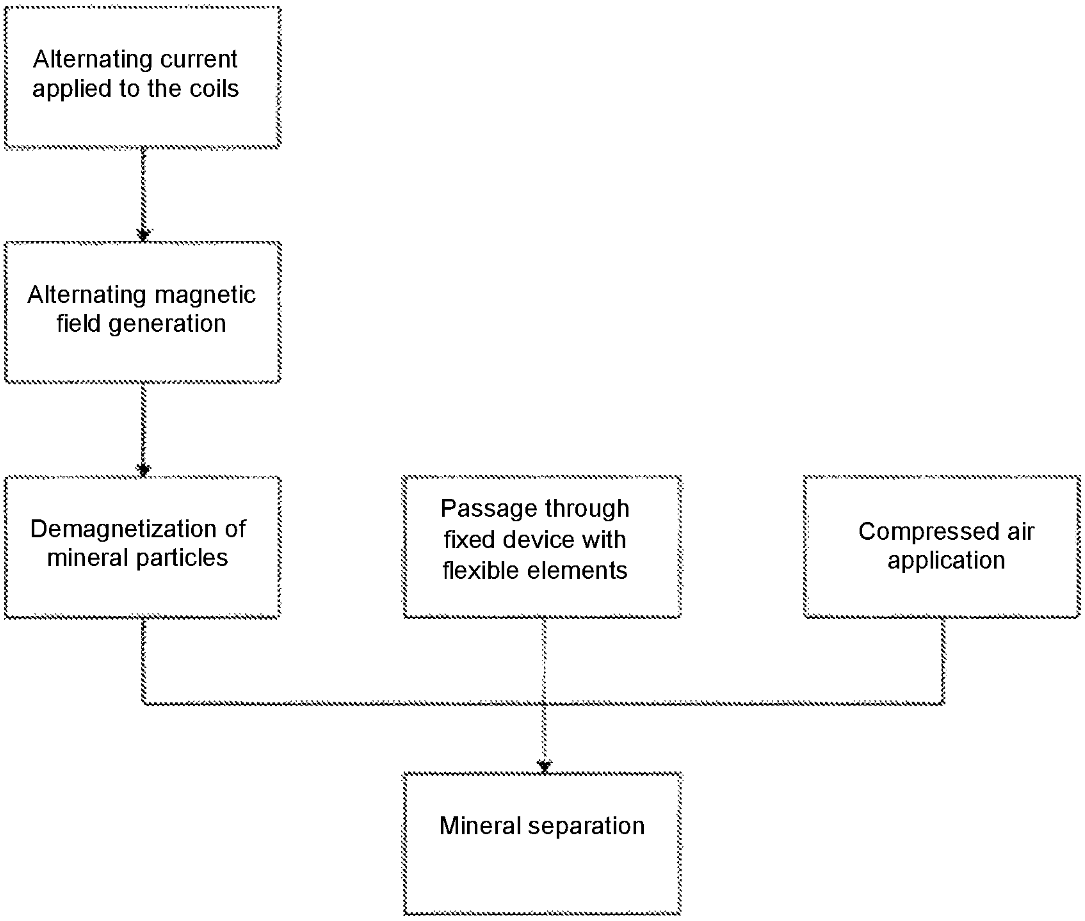
FIG. 3 illustrates a flowchart representing the method for removing iron ore particles adhered by magnetic hysteresis to a matrix of a vertical magnetic separator.

FIG. 3 illustrates a flowchart representing the method for removing iron ore particles adhered by magnetic hysteresis to a matrix of a vertical magnetic separator. As previously described herein, this method, applied to a magnetic separator, essentially comprises the following steps: demagnetizing iron ore particles in a subsequent position to a first collecting tray (7) of at least one collecting tray (7, 8); scraping the magnetic matrix with a mechanical cleaning device (5) positioned subsequently to the demagnetizer (4); and applying jets of compressed air against the magnetic matrix positioned subsequently to the mechanical cleaning device (5) of the magnetic matrix.

The operation of the device begins with the application of an alternating current on a pair of coils positioned on opposite sides of the separation ring (10) in the Helmholtz configuration, in a region above the pouring point of the material to be separated (above the ore accumulation vessel (2)).

The passage of alternating current through the coils generates an alternating magnetic field in the region between them, encompassing part of the separation ring (10). This alternating magnetic field demagnetizes the ore particles attached to the magnetic matrices of the separation ring (10) due to magnetic hysteresis. Next, the separation ring (10) passes through the mechanical cleaning device 5 of the magnetic matrix, dragging the agglomerated material. In a subsequent region, jets of compressed air are applied to the magnetic matrices to separate the particles that remain attached to the matrices without using water.

Thus, more particularly, the demagnetizer (4) can comprise two coils of enameled copper wire, each positioned on one side of the separation ring (10) of the magnetic separator, and adapted to produce an alternating magnetic field due to the alternating current passing through the coils.

Therefore, when using the system and method proposed by this invention, a region of alternating magnetic field will be created at a point in the trajectory of the separation ring (10) by means of a demagnetizer (4). This point is properly determined, located between the ore magnetization region and the compressed air injection point. This alternating magnetic field will demagnetize the particles attached to the magnetic matrices, facilitating the removal of the concerned material adhered to the magnetic matrices by magnetic hysteresis. After demagnetizing the particles, this system will perform a mechanical cleaning on the magnetic matrices using the mechanical cleaning device (5) and inject compressed air to separate the particles.

Therefore, when using the proposed system, there is a clear improvement in the efficiency of the mineral magnetic separation process, in addition to enabling the elimination of water consumption for the separation of ore adhered to the magnetic matrices of vertical magnetic separators, thus reducing financial and environmental impacts.

Numerous variations affecting the scope of protection of this application are allowed. Thus, it must reinforces pointed out that this invention is not limited to the particular configurations/embodiments described above.

The invention claimed is:

1. A system for removing iron ore particles attached by magnetic hysteresis to a magnetic matrix of a vertical magnetic separator, with the vertical magnetic separator comprising:

a separation ring comprising a magnetic matrix;

an ore feed inlet;

an ore accumulation vessel positioned in a lower portion of the magnetic matrix, comprising an outlet for material with low magnetic susceptibility;

a magnetic field-generating device adapted to generate a magnetic field in a region of the accumulation vessel;

at least one collecting tray positioned internally to the magnetic matrix and adapted to collect material with greater magnetic susceptibility detached from the magnetic matrix; and a collecting container adapted to receive the material with greater magnetic susceptibility from the at least one collecting tray, wherein the system comprises:

a demagnetizer positioned above a first collecting tray of the at least one collecting tray;

a mechanical cleaning device for cleaning the magnetic matrix, positioned after the demagnetizer; and at least one compressed air jet-generating device positioned subsequent to the mechanical cleaning device, and wherein water is absent from the system.

2. The system according to claim 1, wherein the vertical magnetic separator is a vertically pulsating high gradient magnetic separator (VPHGMS).

3. The system according to claim 1, comprising two collecting trays in which: a first collecting tray is positioned below the demagnetizer; and a second collecting tray is positioned below the mechanical cleaning device.

4. The system according to claim 1, wherein the mechanical cleaning device is fixed to a fixed structure of the magnetic separator and comprises flexible filaments adapted to be pressed against the magnetic matrix, in which a length of the flexible filaments is increased from a lowermost portion to a uppermost portion of the mechanical cleaning device, and in which the flexible filaments are made of material with zero magnetic properties.

5. The system according to claim 1, wherein the at least one compressed air jet-generating device is positioned in front of the separation ring, in an angled manner so that compressed air that is generated is adapted to reach the magnetic matrix in the opposite direction to the separation ring rotation or parallel to the separation ring rotation, in which the compressed air reaches the magnetic matrix from the side.

6. The system according to claim 1, wherein the demagnetizer comprises two coils of enameled copper wire, each positioned on one side of the separation ring of the magnetic separator in a Helmholtz configuration, in which each of the two coils are adapted to produce an alternating magnetic field due to passage of alternating current through each of the two coils.

7. A method for removing iron ore particles attached by magnetic hysteresis to a magnetic matrix of a vertical magnetic separator, with the vertical magnetic separator comprising:

a separation ring comprising a magnetic matrix;

a feed inlet for feeding ore into an ore accumulation vessel positioned in a lower portion of the magnetic matrix, with the accumulation vessel comprising an outlet of material with low magnetic susceptibility;

a device for generating a magnetic field in a region of the accumulation vessel;

at least one collecting tray positioned internally to the magnetic matrix to collect material with greater magnetic susceptibility detached from the magnetic matrix; and a collecting container to receive the material with greater magnetic susceptibility from the at least one collecting tray, the method comprising:

demagnetizing iron ore particles in a position above a first collecting tray of the at least one collecting tray;

scraping with a mechanical cleaning device the magnetic matrix in a position subsequent to the demagnetizer; and applying direct jets of compressed air against the magnetic matrix in a position subsequent to the mechanical cleaning device, wherein the method is free of water.

8. The method according to claim 7, wherein the vertical magnetic separator is a vertically pulsating high gradient magnetic separator (VPHGMS).

* * * * *